US011164571B2

(12) United States Patent
Luan et al.

(10) Patent No.: US 11,164,571 B2
(45) Date of Patent: Nov. 2, 2021

(54) CONTENT RECOGNIZING METHOD AND APPARATUS, DEVICE, AND COMPUTER STORAGE MEDIUM

(71) Applicant: BAIDU ONLINE NETWORK TECHNOLOGY (BEIJING) CO., LTD., Beijing (CN)

(72) Inventors: Shuhan Luan, Beijing (CN); Yan Zhang, Beijing (CN); Jing Li, Beijing (CN); Fei Wang, Beijing (CN); Yue Liu, Beijing (CN)

(73) Assignees: BAIDU ONLINE NETWORK TECHNOLOGY (BEIJING) CO., LTD., Beijing (CN); SHANGHAI XIAODU TECHNOLOGY CO., LTD., Shanghai (CN)

( * ) Notice: Subject to any disclaimer, the term of this patent is extended or adjusted under 35 U.S.C. 154(b) by 120 days.

(21) Appl. No.: 15/858,968

(22) Filed: Dec. 29, 2017

(65) Prior Publication Data
US 2019/0147865 A1    May 16, 2019

(30) Foreign Application Priority Data
Nov. 16, 2017    (CN) .......................... 201711135625.9

(51) Int. Cl.
*G10L 15/02*    (2006.01)
*G10L 15/22*    (2006.01)
(Continued)

(52) U.S. Cl.
CPC .............. *G10L 15/22* (2013.01); *G10L 15/04* (2013.01); *G10L 15/30* (2013.01); *H04N 21/233* (2013.01);
(Continued)

(58) Field of Classification Search
None
See application file for complete search history.

(56) References Cited

U.S. PATENT DOCUMENTS 8,190,435 B2 *    5/2012    Li-Chun Wang ...... G11B 27/28
704/270
9,330,647 B1 *    5/2016    Bay ...................... G10H 1/0025
(Continued)

FOREIGN PATENT DOCUMENTS

CN    1402852 A    3/2003
CN    103581694    2/2014
(Continued)

OTHER PUBLICATIONS

Samsung Newsroom, "Samsung Smart TV Offers Shazam Music Service to Let Users Identify and Stream Music While Watching TV", https://news.samsung.com/global/samsung-smart-tv-offers-shazam-music-service-to-let-users-identify-and-stream-music-while-watching-tv (Year: 2017).*
(Continued)

*Primary Examiner* — Seong-Ah A Shin
(74) *Attorney, Agent, or Firm* — Ladas & Parry, LLP (57) ABSTRACT

The present disclosure provides a content recognizing method and apparatus, a device and a computer storage medium, wherein the method comprises: a smart multimedia device performing speech recognition and intention parsing for a speech instruction; if a content recognition intention is obtained from the parsing, internally recording multimedia content that is being played by the smart multimedia device; sending internally-recorded media data to a server side, and obtaining a content recognition result returned by the server side for the media data. The user may implement recognition of multimedia content through speech interaction with the
(Continued)

smart multimedia device, and operations are simple without depending on other smart devices.

18 Claims, 5 Drawing Sheets

(51) Int. Cl.
| | |
|---|---|
| *H04N 21/2743* | (2011.01) |
| *H04N 21/422* | (2011.01) |
| *H04N 21/433* | (2011.01) |
| *G10L 15/04* | (2013.01) |
| *G10L 15/30* | (2013.01) |
| *H04N 21/437* | (2011.01) |
| *H04N 21/233* | (2011.01) |
| *H04N 21/439* | (2011.01) |

(52) U.S. Cl.
CPC ... *H04N 21/2743* (2013.01); *H04N 21/42203* (2013.01); *H04N 21/42204* (2013.01); *H04N 21/42222* (2013.01); *H04N 21/437* (2013.01); *H04N 21/4334* (2013.01); *H04N 21/4394* (2013.01); *G10L 2015/223* (2013.01)

(56) References Cited

U.S. PATENT DOCUMENTS

| | | | | |
|---|---|---|---|---|
| 9,418,669 | B2* | 8/2016 | Emerson, III | H04H 60/74 |
| 10,778,830 | B2* | 9/2020 | Jang | H04L 12/282 |
| 2002/0072982 | A1* | 6/2002 | Barton | G06Q 30/0251 |
| | | | | 705/14.1 |
| 2006/0075429 | A1* | 4/2006 | Istvan | H04N 21/42204 |
| | | | | 725/39 |
| 2008/0082510 | A1* | 4/2008 | Wang | H04H 60/40 |
| 2012/0232683 | A1* | 9/2012 | Master | G10L 25/51 |
| | | | | 700/94 |
| 2013/0247082 | A1* | 9/2013 | Wang | H04H 60/40 |
| | | | | 725/14 |
| 2014/0165105 | A1* | 6/2014 | Mountain | H04N 21/8456 |
| | | | | 725/46 |
| 2014/0282632 | A1* | 9/2014 | Hardy | H04N 21/233 |
| | | | | 725/1 |
| 2015/0332667 | A1* | 11/2015 | Mason | G10L 25/81 |
| | | | | 704/249 |
| 2015/0373428 | A1* | 12/2015 | Trollope | G06F 16/7844 |
| | | | | 704/235 |
| 2015/0382047 | A1* | 12/2015 | Van Os | G10L 17/22 |
| | | | | 725/38 |
| 2016/0156731 | A1* | 6/2016 | Wang | H04L 65/601 |
| | | | | 709/217 |
| 2017/0026683 | A1 | 1/2017 | Joao | |
| 2017/0238065 | A1* | 8/2017 | Jang | H04N 21/251 |
| | | | | 725/19 |
| 2017/0286049 | A1* | 10/2017 | Kim | G10L 15/30 |
| 2018/0199101 | A1* | 7/2018 | Kim | H04N 21/437 |
| 2019/0147881 | A1* | 5/2019 | Igarashi | G10L 15/30 |
| | | | | 704/251 |
| 2019/0325224 | A1* | 10/2019 | Lee | G10L 15/22 |

FOREIGN PATENT DOCUMENTS

| | | |
|---|---|---|
| CN | 104616654 | 5/2015 |
| CN | 105100911 | 11/2015 |
| CN | 106462636 | 1/2016 |
| CN | 106254915 | 12/2016 |
| CN | 106993196 | 7/2017 |

OTHER PUBLICATIONS

"Samsung Smart TV Offers Shazam Music Service to Let Users Identify and Stream Music While Watching TV" (Year: 2017).*

1st Office Action dated Mar. 1, 2019 and search report dated Feb. 20, 2019 for Chinese Patent Application No. 201711135625.9 and its English translation provided by Global dossier.

2nd Office Action dated May 15, 2019 for Chinese Patent Application No. 201711135625.9 and its English translation provided by Global dossier.

Supplemental search report dated May 7, 2019 for Chinese Patent Application No. 201711135625.9 and its English translation provided by Global dossier.

Notification to Grant Patent Right for Invention and Supplementary Search Report from CN app. No. 201711135625.9, dated Oct. 28, 2020.

* cited by examiner

CONTENT RECOGNIZING METHOD AND APPARATUS, DEVICE, AND COMPUTER STORAGE MEDIUM

CROSS REFERENCE TO RELATED APPLICATION

The present application claims priority to Chinese Patent Application No. 201711135625.9, filed on Nov. 16, 2017, with the title of "Content recognizing method and apparatus, device, and computer storage medium", the disclosure of which is hereby incorporated herein by reference in its entirety.

The present application claims the priority of Chinese Patent Application No. 201711135625.9, filed on Nov. 16, 2017, with the title of "Content recognizing method and apparatus, device, and computer storage medium".

FIELD OF THE DISCLOSURE

The present disclosure relates to the technical field of computer application, and particularly to a content recognizing method and apparatus, a device and a computer storage medium.

BACKGROUND OF THE DISCLOSURE

As one of most kernel household appliances with the highest coverage, a TV set is an important channel for a user to watch video, listen songs for recreation and obtain information. Upon watching TV content, the user might have problems regarding the content that is being played. For example, when the user sees a star that he does not know in the TV program, he wants to know who the star is; when the user is listening to a nice song in a TV play, he wants to know the name of the song.

At present, many applications such as "listen to a song, recognize song name" appear at a mobile phone terminal. However, the user needs to open an application on his mobile phone, and then record external surrounding audio through a mobile phone microphone and then perform matching and recognition. This manner is implemented depending on the mobile phone and is relatively complicated in operations. Sometimes, to ensure accurate recognition, the user needs to walk closer to the TV set to externally record audio with sufficient quality and volume.

SUMMARY OF THE DISCLOSURE

In view of the above, the present disclosure provides a content recognizing method and apparatus, a device and a computer storage medium, to facilitate simplification of the user's operations.

Specific technical solutions are as follows:

The present disclosure provides a content recognizing method, comprising:

a smart multimedia device performing speech recognition and intention parsing for a speech instruction;

internally recording multimedia content that is being played by the smart multimedia device;

sending internally-recorded media data to a server side, and obtaining a content recognition result returned by the server side for the media data.

According to a specific implementation mode of the present disclosure, if a content recognition intention is obtained from the intention parsing, performing internal recording of multimedia content that is being played by the smart multimedia device.

According to a specific implementation mode of the present disclosure, the smart multimedia device comprises a smart TV set, a smart acoustic enclosure or a smart projector.

According to a specific implementation mode of the present disclosure, the smart multimedia device performing speech recognition and intention parsing for the speech instruction comprises:

the smart multimedia device sending the speech instruction to the server side, and obtaining a result after the server side performs speech recognition and intention parsing for the speech instruction.

According to a specific implementation mode of the present disclosure, the internally recording multimedia content that is being played by the smart multimedia device comprises:

collecting video frames from a graphics card of the smart multimedia device; or collecting audio stream from a sound card of the smart multimedia device.

According to a specific implementation mode of the present disclosure, the method further comprises:

displaying the content recognition result in the form of speech; or displaying the content recognition result on a display screen.

The present disclosure further provides a content recognizing apparatus arranged at a smart multimedia device, the apparatus comprising:

a speech processing module configured to perform speech recognition and intention parsing for a speech instruction;

a media internally-recording module configured to internally record multimedia content that is being played by the smart multimedia device;

a content recognizing module configured to send media data internally recorded by the media internally-recording module to a server side, and obtain a content recognition result returned by the server side for the media data.

According to a specific implementation mode of the present disclosure, the media internally-recording module is configured to, when the speech processing module obtains a content recognition intention from the parsing, perform internal recording of multimedia content that is being played by the smart multimedia device.

According to a specific implementation mode of the present disclosure, the smart multimedia device comprises a smart TV set, a smart acoustic enclosure or a smart projector.

According to a specific implementation mode of the present disclosure, the speech processing module is specifically configured to send the speech instruction to the server side, and obtain a result after the server side performs speech recognition and intention parsing for the speech instruction.

According to a specific implementation mode of the present disclosure, the media internally-recording module is specifically configured to:

collect video frames from a graphics card of the smart multimedia device; or collect audio stream from a sound card of the smart multimedia device.

According to a specific implementation mode of the present disclosure, the apparatus further comprises:

a result displaying module configured to display the content recognition result in the form of speech; or display the content recognition result on a display screen.

The present disclosure further provides a device, comprising:
one or more processors;
a memory for storing one or more programs;
when said one or more programs are executed by said one or more processors, said one or more processors are enabled to implement the aforesaid method.

The present disclosure further provides a storage medium including a computer-executable instruction, wherein the computer-executable instruction, when executed by a computer processor, is used to implement the aforesaid method.

It can be known from the above technical solutions that according to the above technical solutions provided by the present disclosure, the user may implement recognition of multimedia content through speech interaction with the smart multimedia device, and operations are simple without depending on other smart devices.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

A core idea of the present disclosure lies in that a smart multimedia device is integrated with functions such as speech recognition, intention parsing and multimedia internal-recording so that the user may implement recognition of multimedia content through speech interaction with the smart multimedia device, and operations are simple without depending on other smart devices.

The smart multimedia device involved in embodiments of the present disclosure may comprise but is not limited to a smart TV set, a smart acoustic enclosure and a smart projector. The smart TV set is taken as an example in subsequent embodiments of the present disclosure.

Figure 1:
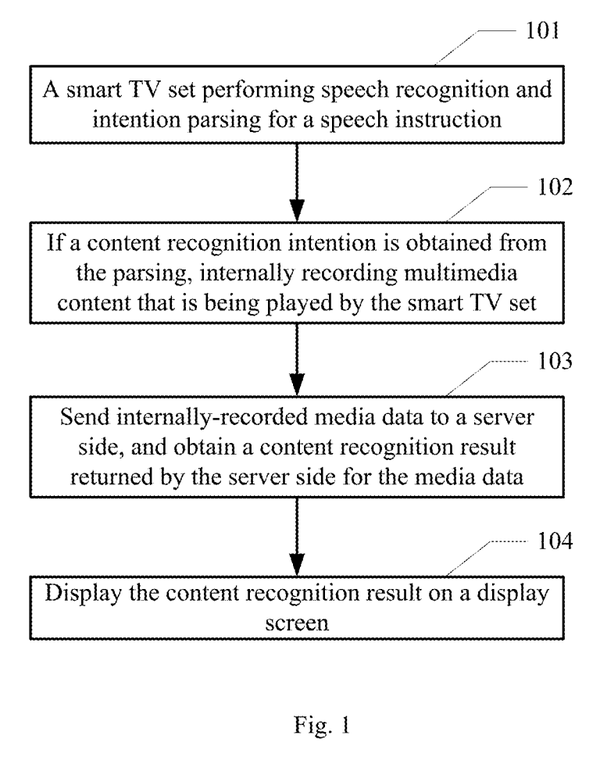
FIG. 1 is a flow chart of a content recognizing method according to an embodiment of the present disclosure.

FIG. 1 is a flow chart of a content recognizing method according to an embodiment of the present disclosure. As shown in FIG. 1, the method may comprise the following steps:

In 101, a smart TV set performs speech recognition and intention parsing for a speech instruction.

A subject for implementing the method may be a content recognizing apparatus, which may be a client located at the smart TV set, or may further be a plug-in located at the smart TV set client or a function unit such as a Software Development Kit (SDK). This is not specifically limited by the embodiment of the present disclosure.

While the user is watching a smart TV program, if he is interested in the content that is being played by the smart TV set, for example, if he wants to know the name of a song that is being played, he may send a speech instruction "help me to find out the name of the song" to the smart TV set. Again for example, if the user wants to know the name of the actor in the TV picture, he may send a speech instruction "help me to find out the name of the actor" to the smart TV set.

Figure 2:
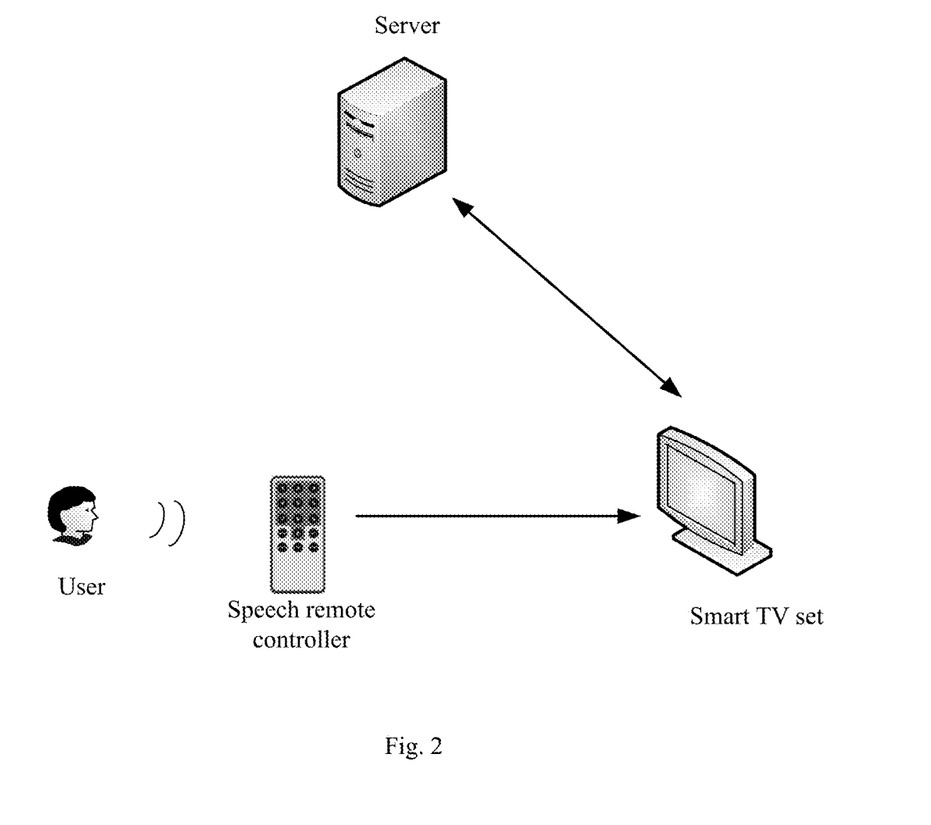
FIG. 2 is a diagram showing components of a system according to an embodiment of the present disclosure.

The smart TV set may collect the user speech instruction through a built-in microphone, and then the client begins to perform the processing of this step. It is also feasible that the user's speech instructions may be collected through a microphone on a speech remote controller, and then sent to the client of the smart TV set, and then the client begins to perform the processing of this step, as shown in FIG. 2.

If the client itself of the smart TV set has a function of speech recognition and intentions parsing for the speech instruction, speech recognition and intention parsing is directly performed for the speech instruction. Alternatively, if the smart TV set itself has a speech recognition function for the speech instruction, a speech recognition result is sent to a server side, and the server side performs intentional parsing for the speech recognition result and returns a parsing result to the client of the smart TV set. Alternatively, the smart TV set sends the speech instruction to the server side, and the server side performs speech recognition and intention parsing for the speech instruction, and returns a parsing result to the client of the smart TV set.

The speech recognition is a procedure of converting a speech instruction into a text. A specific speech recognition technology is not limited in the present disclosure, and may employ any current speech recognition technology.

Intention parsing means parsing the text resulting from the speech recognition by employing natural language analysis technology, determining the user intention corresponding to the speech instruction, and correspondingly obtaining the user's structural demand. The structural demand corresponds to a matching database employed by subsequent content recognition. For example, when the user intends to recognize audio, when the server returns the content recognition result according to media data in the subsequent step 103, the employed matching database is an audio database. When the user intends to recognize a character, when the server returns the content recognition result according to media data in the subsequent step 103, the employed matching database is a person picture database.

Likewise, the manner of performing the intention parsing is not limited in the present disclosure, and it may employ for example template-matching parsing or machine learning parsing.

In 102, if the content recognition intention is parsed, multimedia content that is being played by the smart TV set is internally recorded.

In this step, it is feasible to internally record audio stream that is being played by the smart TV set, or internally record video frames that is being played, or internally record the audio stream and the video frames simultaneously. The content specifically recorded internally may correspond to the recognized intention. For example, if the recognized intention is recognition of audio content, for example, recognition of a song, the audio stream that is being played may be recorded internally. If the recognized intention is recognition of video content, for example, recognition of a character, the video frames that is being played may be recorded internally. A correspondence relationship between the type of intention and the internally-recorded content may be pre-configured.

When the audio stream that is being played is recorded internally, the audio stream may be collected from a sound card of the smart TV set. For example, TinyAlsa may be used to collect the audio stream of the sound card. TinyAlsa is an Alsa core-based user-layer audio interface presented by Google after Android 4.0. TinyAlsa may be used to obtain the audio stream of the sound card of the device. Certainly, the present disclosure is not limited to TinyAlsa and may also employ other tools to collect the audio stream of the sound card.

When the video frames that is being played is recorded internally, the video frames may be collected from a graphics card of the smart TV set. For example, Screencap may be used. Screencap is a screen capture tool built in the system. The video frames of the graphics card of the device may be obtained through the Screencap. Certainly, the present disclosure is not limited to Screencap and may also employ other tools to collect the video frames of the graphics card.

Step 103 relates to sending internally-recorded media data to the server side, and obtaining a content recognition result returned by the server side for the media data.

Since content recognition for media data usually needs a matching database with a large amount of data, the client of the smart TV set may send the internally-recorded media data to the server side, and the server side matches the media data with the matching database to obtain a content recognition result.

For example, the client sends the internally-recorded audio stream to the server side, and the server side matches the audio stream with the audio database to obtain content corresponding to the audio stream, for example a song name or a singer's name. The type of the database for matching and the type of the obtained content recognition result are determined according to the user's specific intention, for example, if the user's intention is to "recognize a song name", a song database is matched to obtain the song name corresponding to the audio stream.

Again for example, the client sends the internally-recorded video frames to the server side, and the server side matches the video frames with an image database to obtain content corresponding to the video frames, for example, a name of the TV play, a person's name or a scenic spot. The type of the database for matching and the type of the obtained content recognition result are determined according to the user's specific intention, for example, if the user's intention is "to recognize a person's name", a person picture database is matched to obtain the person's name.

In addition, since the employed database and the type of the content recognition result are determined according to the user's specific intention when the server side matches the internally-recorded media data with the database, the client of the smart TV set may simultaneously carry an intention parsing result while sending the media data to the server side. If the intention parsing in step 101 is performed by the server side, in the present step the client of the smart TV set might not carry the intention parsing result while sending the media data to the server side, and the server side may determine a corresponding intention parsing result according to session information.

104, the content recognition result is displayed on a display screen.

As far as the smart TV set is concerned, the content recognition result may be displayed through a display screen. For example, the content recognition result is displayed on the display screen of the smart TV set in the form of a popup window, or the content recognition result is displayed in the form of a Draw Marquee-LED Banner. Play of the current multimedia content may be continued or paused while the content recognition result is displayed.

The content recognition result may be displayed in the form of speech, for example, the speech of the content recognition result is played through a loudspeaker. Likewise, play of the current multimedia content may be continued or paused while the speech is played. This form is well adapted for a multimedia device without a display screen such as a smart acoustic enclosure.

Figure 3:
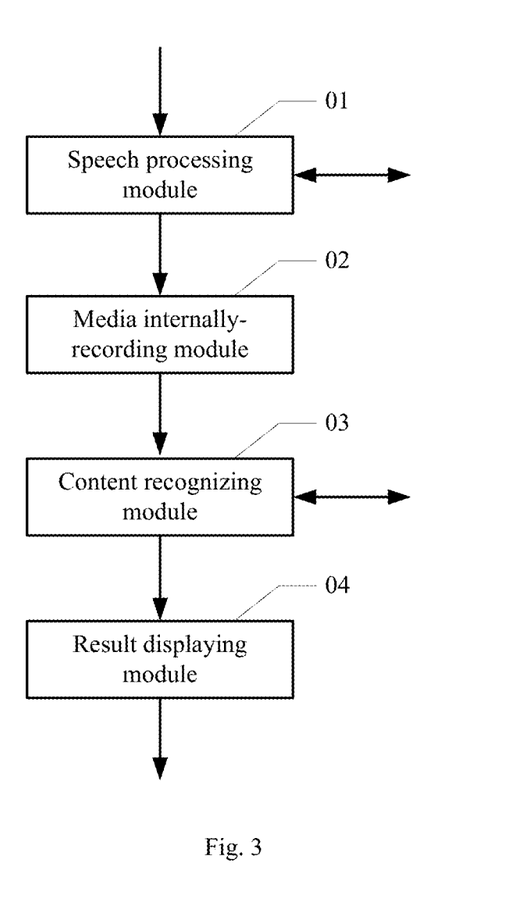
FIG. 3 is a block diagram of a content recognizing apparatus according to an embodiment of the present disclosure.

FIG. 3 is a block diagram of a content recognizing apparatus according to an embodiment of the present disclosure. The apparatus may be disposed at a smart multimedia device. The smart multimedia device may include but is not limited to a smart TV set, a smart acoustic enclosure or a smart projector. As shown in FIG. 3, the apparatus may comprise a speech processing module 01, a media internally-recording module 02 and a content recognizing module 03, and may further comprise a result displaying module 04. Main functions of the modules are as follows:

The speech processing module 01 is configured to perform speech recognition and intention parsing for a speech instruction. The speech processing module 01 is configured to obtain the user's speech instruction directly through a microphone built in the smart multimedia device, or obtain the user's speech instruction from a speech remote controller.

If the client itself of the smart TV set has a function of speech recognition and intentions parsing for the speech instruction, the speech processing module 01 may directly perform speech recognition and intention parsing for the speech instruction. Alternatively, the smart TV set itself has a speech recognition function for the speech instruction, the speech processing module 01 sends a speech recognition result to a server side, and the server side performs intentional parsing for the speech recognition result and returns a parsing result to the speech processing module 01. Alternatively, the speech processing module 01 sends the speech instruction to the server side, and the server side performs speech recognition and intention parsing for the speech instruction, and returns a parsing result to the speech processing module 01.

The media internally-recording module 02 is configured to, when the speech processing module 01 parses the content recognition intention, internally record multimedia content that is being played by the smart multimedia device.

The media internally-recording module 02 may internally record audio stream that is being played by the smart multimedia device, or internally record video frames that is being played, or internally record the audio stream and the video frames simultaneously. The content specifically recorded internally may correspond to the recognized intention. For example, if the recognized intention is recognition of audio content, for example, recognition of a song, the audio stream that is being played may be recorded internally. If the recognized intention is recognition of video content, for example, recognition of a character, the video frames that is being played may be recorded internally. A correspondence relationship between the type of intention and the internally-recorded content may be pre-configured.

When the audio stream that is being played is recorded internally, the audio stream may be collected from a sound card of the smart multimedia device. For example, TinyAlsa may be used to collect the audio stream of the sound card. TinyAlsa is an Alsa core-based user-layer audio interface presented by Google after Android 4.0. TinyAlsa may be used to obtain the audio stream of the sound card of the device. Certainly, the present disclosure is not limited to TinyAlsa and may also employ other tools to collect the audio stream of the sound card.

When the video frames that is being played is recorded internally, the video frames may be collected from a graphics card of the smart TV set. For example, Screencap may be used. Screencap is a screen capture tool built in the system. The video frames of the graphics card of the device may be obtained through the Screencap. Certainly, the present disclosure is not limited to Screencap and may also employ other tools to collect the video frames of the graphics card.

The content recognizing module 03 is configured to send media data internally recorded by media internally-recording module 02 to the server side, and obtain a content recognition result returned by the server side for the media data.

For example, the content recognizing module 03 sends the internally-recorded audio stream to the server side, and the server side matches the audio stream with a audio database to obtain content corresponding to the audio stream, for example a song name or a singer's name. The type of the database for matching and the type of the obtained content recognition result are determined according to the user's specific intention, for example, if the user's intention is to "recognize a song name", a song database is matched to obtain the song name corresponding to the audio stream.

Again for example, the content recognizing module 03 sends the internally-recorded video frames to the server side, and the server side matches the video frames with an image database to obtain content corresponding to the video frames, for example, a name of the TV play, a person's name or a scenic spot. The type of the database for matching and the type of the obtained content recognition result are determined according to the user's specific intention, for example, if the user's intention is "to recognize a person's name", a person picture database is matched to obtain the person's name.

The result displaying module 04 is configured to display the content recognition result. The content recognition result may be displayed through a display screen. For example, the content recognition result is displayed on the display screen of the smart TV set in the form of a popup window, or the content recognition result is displayed in the form of a Draw Marquee-LED Banner. Play of the current multimedia content may be continued or paused while the content recognition result is displayed.

The content recognition result may be displayed in the form of speech, for example, the speech of the content recognition result is played through a loudspeaker. Likewise, play of the current multimedia content may be continued or paused while the speech is played. This form is well adapted for a multimedia device without a display screen such as a smart acoustic enclosure.

Figure 4A:
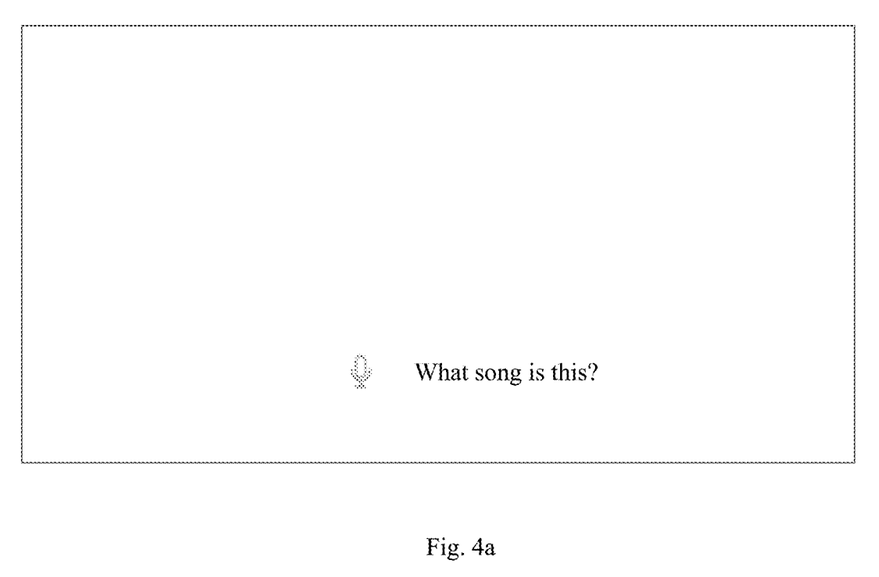
FIG. 4a-FIG. 4c are schematic diagrams of display of information on a smart TV set interface according to an embodiment of the present disclosure.
Figure 4B:
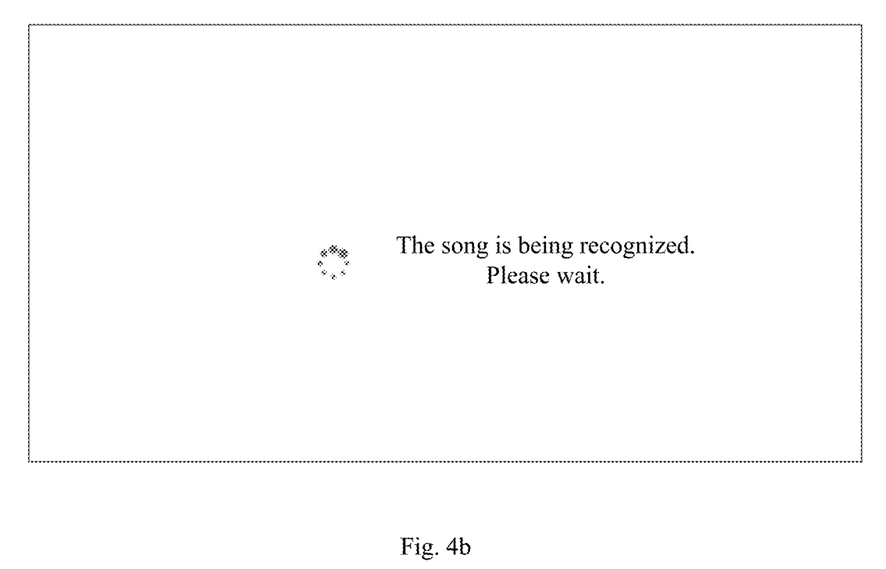
Figure 4C:
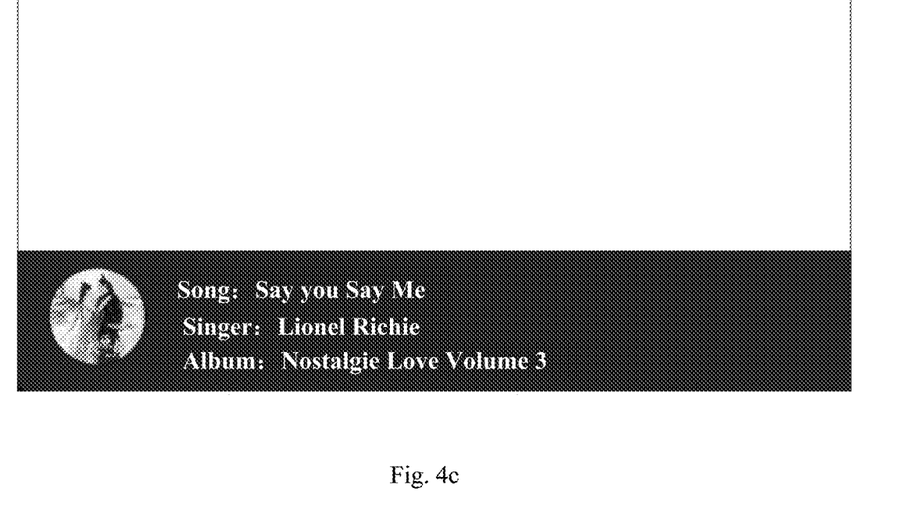

Several examples are presented below:

Assume the user is using the smart TV set to water a TV play and hear a very interesting song, he may send a speech instruction "what song is it". After receiving the speech instruction, the smart TV set performs speech recognition for the speech instruction, a speech recognition result may be displayed on the smart TV set interface as shown in FIG. 4a. Furthermore, after intention recognition is performed, the intention is determined as recognizing the song name. Then, the audio stream of the sound card is internally recorded and reported to the cloud server. The cloud server matches the audio stream in the song database, and obtains the song name and then returns it to the smart TV set. During the above intention recognition and matching of the song database, the smart TV set interface may display the interface as shown in FIG. 4b to prompt the user that the current state is song recognition. After obtaining the song name, the smart TV set may display the song name on the interface in the form of a window. Certainly, other information related to the song, for example, singe and source, may be further displayed, as shown in FIG. 4c.

The above embodiment is described by taking the smart TV set as an example. Other multimedia devices such as a smart acoustic enclosure and a smart projector also apply. Take a smart acoustic enclosure as an example. The user may input a speech instruction such as "help me to find out the name of the song" through a microphone built in the smart acoustic enclosure. The smart acoustic enclosure performs speech recognition and intention parsing for the speech instruction, determines that the intention is content parsing, namely, the intention about query for the song's name, internally records the audio stream that is being played currently and then uploads it to the server side. The server side matches the audio stream with the database corresponding to the intention, namely, matches the audio stream with the song database, determines the song name corresponding to the audio and then returns it to the smart acoustic enclosure. The smart acoustic enclosure may display the song name to the user in the form of speech.

Figure 5:
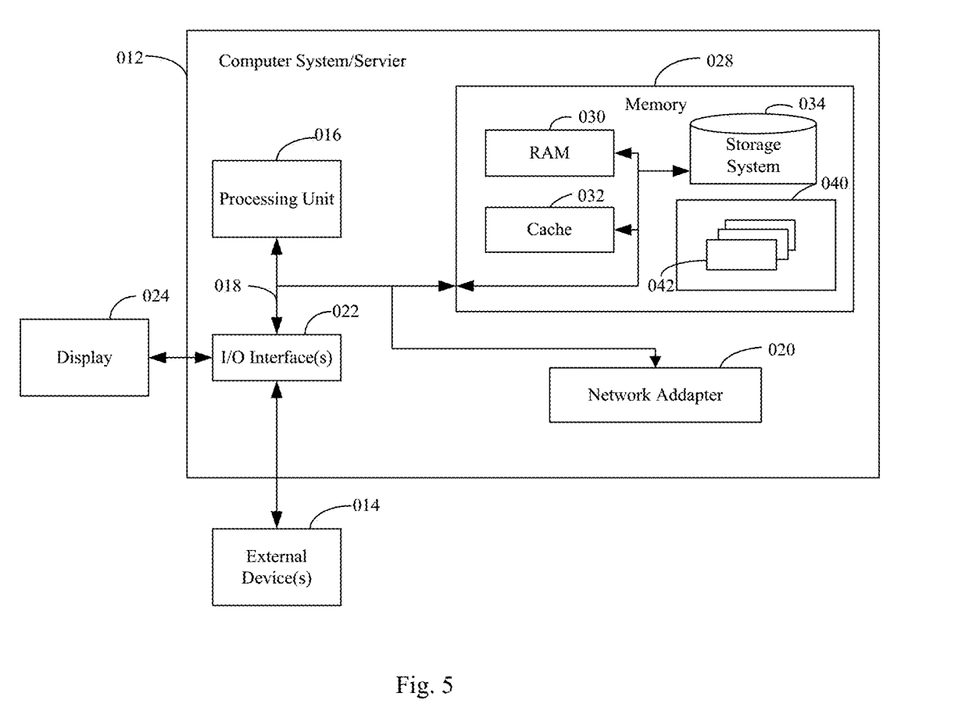
FIG. 5 illustrates a block diagram of an example computer system adapted to implement an implementation mode of the present disclosure.

FIG. 5 is a block diagram of an example computer system adapted to implement an implementation mode of the present disclosure. The computer system 012 shown in FIG. 5 is only an example and should not bring about any limitation to the function and scope of use of the embodiments of the present disclosure.

As shown in FIG. 5, the computer system 012 is shown in the form of a general-purpose computing device. The components of computer system 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnect (PCI) bus.

Computer system 012 typically includes a variety of computer system readable media. Such media may be any available media that is accessible by computer system 012, and it includes both volatile and non-volatile media, removable and non-removable media.

Memory 028 can include computer system readable media in the form of volatile memory, such as random access memory (RAM) 030 and/or cache memory 032. Computer system 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system 012 may also communicate with one or more external devices 014 such as a keyboard, a pointing device, a display 024, etc.; with one or more devices that enable a user to interact with computer system 012; and/or with any devices (e.g., network card, modem, etc.) that enable computer system 012 to communicate with one or more other computing devices. Such communication can occur via Input/Output (I/O) interfaces 022. Still yet, computer system 012 can communicate with one or more networks such as a local area network (LAN), a general wide area network (WAN), and/or a public network (e.g., the Internet) via network adapter 020. As depicted in FIG. 5, network adapter 020 communicates with the other communication modules of computer system 012 via bus 018. It should be understood that although not shown, other hardware and/or software modules could be used in conjunction with computer system 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the flow of the method according to an embodiment of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, said one or more processors execute the flow of the method according to the embodiment of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A content recognizing method, wherein the method comprises:
    a smart multimedia device receiving a speech instruction, and sending the speech instruction to a server side which performs speech recognition and intention parsing for the speech instruction;
    the smart multimedia device receiving the parsed intention from the server side and internally recording the content of the part of multimedia content that is being played by the smart multimedia device, which has a type corresponding to the parsed intention, according to a pre-configured correspondence relationship between the intention and the type of the internally recorded content, wherein the intention comprises audio recognition and image recognition, and wherein the internally recorded content which has the type corresponding to the parsed intention comprises an audio stream or video frames that is being played by the smart multimedia device;
    the smart multimedia device sending the internally-recorded media data to the server side, and obtaining a content recognition result returned by the server side for the media data.

2. The method according to claim 1, wherein if a content recognition intention is obtained from the intention parsing, performing internal recording of multimedia content that is being played by the smart multimedia device.

3. The method according to claim 1, wherein the smart multimedia device comprises a smart TV set, a smart acoustic enclosure or a smart projector.

4. The method according to claim 1, wherein the smart multimedia device performing speech recognition and intention parsing for the speech instruction comprises:
    the smart multimedia device sending the speech instruction to the server side, and obtaining a result after the server side performs speech recognition and intention parsing for the speech instruction.

5. The method according to claim 1, wherein the internally recording multimedia content that is being played by the smart multimedia device comprises:
    collecting video frames from a graphics card of the smart multimedia device; or
    collecting audio stream from a sound card of the smart multimedia device.

6. The method according to claim 1, wherein the method further comprises:
    displaying the content recognition result in the form of speech; or
    displaying the content recognition result on a display screen.

7. A smart multimedia device, wherein the smart multimedia device comprises:
    one or more processors;
    a memory for storing one or more programs;
    when said one or more programs are executed by said one or more processors, said one or more processors are enabled to implement the following operation:
    receiving a speech instruction, and sending the speech instruction to a server side which performs speech recognition and intention parsing for the speech instruction;
    receiving the parsed intention from the server side and internally recording the content of the part of multimedia content that is being played by the smart multimedia device, which has a type corresponding to the parsed intention, according to a pre-configured correspondence relationship between the intention and the type of the internally recorded content, wherein the intention comprises audio recognition and image recognition, and wherein the internally recorded content which has the type corresponding to the parsed intention comprises an audio stream or video frames that is being played by the smart multimedia device;
    sending the internally-recorded media data to the server side, and obtaining a content recognition result returned by the server side for the media data.

8. The smart multimedia device according to claim 7, wherein if a content recognition intention is obtained from the intention parsing, performing internal recording of multimedia content that is being played by the smart multimedia device.

9. The smart multimedia device according to claim 7, wherein the smart multimedia device comprises a smart TV set, a smart acoustic enclosure or a smart projector.

10. The smart multimedia device according to claim 7, wherein the operation of performing speech recognition and intention parsing for the speech instruction comprises:
    sending the speech instruction to the server side, and obtaining a result after the server side performs speech recognition and intention parsing for the speech instruction.

11. The smart multimedia device according to claim 7, wherein the internally recording multimedia content that is being played by the smart multimedia device comprises:
    collecting video frames from a graphics card of the smart multimedia device; or
    collecting audio stream from a sound card of the smart multimedia device.

12. The smart multimedia device according to claim 7, wherein the operation further comprises:
    displaying the content recognition result in the form of speech; or
    displaying the content recognition result on a display screen.

13. A non-transitory computer storage medium in which one or more programs are stored, an apparatus being enabled to execute the following operation when said one or more programs are executed by the apparatus:

receiving a speech instruction, and sending the speech instruction to a server side which performs speech recognition and intention parsing for the speech instruction;

receiving the parsed intention from the server side and internally recording the content of the part of multimedia content that is being played by a smart multimedia device, which has a type corresponding to the parsed intention, according to a pre-configured correspondence relationship between the intention and the type of internally recorded content, wherein the intention comprises audio recognition and image recognition, and wherein the internally recorded content which has the type corresponding to the parsed intention comprises an audio stream or video frames that is being played by the smart multimedia device;

sending the internally-recorded media data to the server side, and obtaining a content recognition result returned by the server side for the media data.

14. The non-transitory computer storage medium according to claim 13, wherein if a content recognition intention is obtained from the intention parsing, performing internal recording of multimedia content that is being played by the smart multimedia device.

15. The non-transitory computer storage medium according to claim 13, wherein the smart multimedia device comprises a smart TV set, a smart acoustic enclosure or a smart projector.

16. The non-transitory computer storage medium according to claim 13, wherein the operation of performing speech recognition and intention parsing for the speech instruction comprises:

sending the speech instruction to the server side, and obtaining a result after the server side performs speech recognition and intention parsing for the speech instruction.

17. The non-transitory computer storage medium according to claim 13, wherein the internally recording multimedia content that is being played by a smart multimedia device comprises:

collecting video frames from a graphics card of the smart multimedia device; or collecting audio stream from a sound card of the smart multimedia device.

18. The non-transitory computer storage medium according to claim 13, wherein the operation further comprises:

displaying the content recognition result in the form of speech; or displaying the content recognition result on a display screen.

* * * * *